United States Patent [19]
Baranyovits et al.

[11] 3,760,076
[45] Sept. 18, 1973

[54] COMBATING PESTS WITH BENZOTHIADIOZINES

[75] Inventors: Francis Leslie Charles Baranyovits, Wokingham; Joan Irene Masters, Crowthorne, both of England

[73] Assignee: Imperial Chemical Industries Limited, London, England

[22] Filed: Oct. 8, 1970

[21] Appl. No.: 79,322

[30] Foreign Application Priority Data
Mar. 12, 1970 Great Britain.................. 11,935/70

[52] U.S. Cl.................. 424/246, 260/243, 424/245
[51] Int. Cl............................................. A01n 9/12
[58] Field of Search........................... 424/246, 245; 260/243 D

[56] References Cited
UNITED STATES PATENTS
3,520,883   7/1970   Yale.................................. 260/243

Primary Examiner—Albert T. Meyers
Assistant Examiner—Leonard Schenkman
Attorney—Cushman, Darby and Cushman

[57] ABSTRACT

Methods and compositions for combating pests wherein the active component is a 3-amino-1H-2,1,4-benzothiadiazine and the corresponding sulphoxide; and acid addition salts and metal derivatives thereof.

5 Claims, No Drawings

COMBATING PESTS WITH BENZOTHIADIOZINES

This invention relates to chemical compounds, to methods for preparing them, to compositions comprising them, and to methods of controlling pests using them.

The present invention provides a 3-amino-1H-2,1,4-benzothiadiazine and the corresponding sulphoxide; and acid addition salts and metal derivatives More particularly the invention provides a compound having the formula:

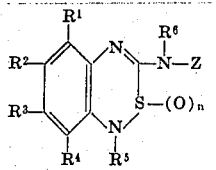

wherein Z represents an atom of hydrogen or unsubstituted or substituted hydrocarbon group, or a group

or a cyano group; $R^1$, $R^2$, $R^3$ and $R^4$ represent atoms of hydrogen or halogen, or unsubstituted or substituted hydrocarbon groups, or cyano, hydroxy, alkoxy, nitro, carboxylic acid, carboxamide, carboxylic ester, sulphonic acid, sulphonamide or sulphonate groups, or unsubstituted or substituted amino groups; $R^5$ and $R^6$ represent hydrogen atoms or unsubstituted or substituted hydrocarbon groups; R represents an unsubstituted or substituted hydrocarbon group, or an alkoxy, alkylthio, aryloxy or arylthio group, or an unsubstituted or substituted amino group, or a hydrazino group, or a nitrogen- containing heterocyclic group linked to the carbon atom of the C=X group through the nitrogen atom; X represents an atom of oxygen or sulphur or an imino group; n has the value zero or 1; or an acylated derivative thereof; or an acid addition salt or metal derivative of such compound or acylated derivative.

More especially the invention provides a compound having the formula:

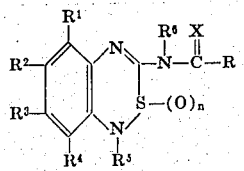

wherein $R^1$, $R^2$, $R^3$ and $R^4$ represent atoms of hydrogen or halogen, or unsubstituted or substituted hydrocarbon groups, or alkoxy groups or unsubstituted amino groups; $R^5$ and $R^6$ represent hydrogen atoms or unsubstituted or substituted hydrocarbon groups; R represents an unsubstituted or substituted hydrocarbon group, or an alkoxy, alkylthio, aryloxy or arylthio group, or an unsubstituted or substituted amino group, or a hydrazino group, or a nitrogen- containing heterocyclic group linked to the carbon atom of the C=X group through the nitrogen atom; X represents an atom of oxygen or sulphur or an imino group; n has the value zero or 1; or an acylated derivative thereof; or an acid addition salt or metal derivative of such compound or acylated derivative.

In a preferred aspect the invention provides a compound having the formula:

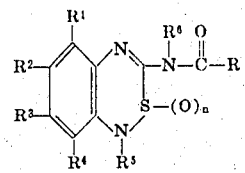

wherein $R^1$, $R^2$, $R^3$ and $R^4$ represent atoms of hydrogen or halogen, or hydrocarbyl, hydrocarbyloxy, amino or substituted amino groups; $R^5$ represents an atom of hydrogen or a hydrocarbyl group, or an acyl group; $R^6$ represents an atom of hydrogen or a hydrocarbyl group; and R represents a hydrocarbyl, hydrocarbyloxy, hydrocarbylthio or amino or substituted amino group; and n has the value zero or 1.

By the term "acyl" as used herein is intended not only acyl groups derived from carboxylic acids including carbonic, carbamic, allophanic acids, but includes also acyl groups derived from sulphenic, sulphinic and sulphonic acids.

In a more preferred aspect the invention provides a compound having the formula:

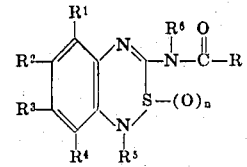

wherein $R^1$, $R^2$, $R^3$ and $R^4$ represent atoms of hydrogen or halogen or alkyl, alkoxy, amino or acylamino groups; $R^5$ represents an atom of hydrogen, an aralkyl group, or an acyl, carbamoyl, allophanoyl, sulphenyl or sulphonyl group; $R^6$ represents an atom of hydrogen or an alkyl, alkenyl, aryl or aralkyl group; and R represents an alkyl, aryl, arylthio, alkylamino, arylamino, or alkoxy group; and n has the value zero or 1.

In an even more preferred aspect the invention provides a compound having the formula:

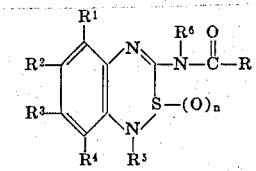

wherein $R^1$, $R^2$, $R^3$ and $R^4$ represent atoms of hydrogen or halogen, alkyl groups comprising from one to 6 carbon atoms, alkoxy groups comprising from one to 6 carbon atoms, amino groups, acylamino groups comprising from one to 10 carbon atoms, or alkoxycarbonylamino groups comprising from two to 7 carbon atoms; $R^5$ represents an atom of hydrogen, an aralkyl group comprising from 7 to 10 carbon atoms, a haloalkylsulphenyl group comprising from one to 6 carbon atoms, an alkanesulphonyl group comprising from one to 6 carbon atoms, or a group $R^7CO$- where $R^7$ represents an atom of hydrogen, an alkyl group comprising from one to 18 carbon atoms, an alkenyl group comprising from two to 6 carbon atoms, an aralkyl group comprising from 7 to 10 carbon atoms, a cyanoalkylamino or alkythioalkylamino group comprising from two to 18 carbon atoms, an aryl group comprising from 6 to 12 carbon atoms, a haloalkyl group comprising from one to 6 carbon atoms, a haloaryl group comprising from 6 to 12 carbon atoms, an alkylamino group comprising from one to 18 carbon atoms, an arylamino group comprising from 6 to 12 carbon atoms, or a heterocyclic radical; $R^6$ represents an atom of hydrogen, an alkyl group comprising from one to 6 carbon atoms, an alkenyl group comprising from one to 6 carbon atoms, an aryl group comprising from 6 to 12 carbon atoms or an aralkyl group comprising from 7 to 10 carbon atoms; and R represents an alkyl group comprising from one to 6 carbon atoms, an aryl group comprising from 6 to 12 carbon atoms, an arylthio group comprising from 6 to 12 carbon atoms, an arylamino group comprising from 6 to 12 carbon atoms, an alkylamino group comprising from one to 6 carbon atoms, or an alkoxy group comprising from 1 to 6 carbon atoms; and n has the value zero or 1.

In an especially preferred aspect the invention provides a compound having the formula:

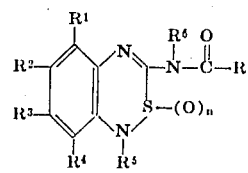

wherein $R^1$, $R^2$, $R^3$ and $R^4$ represent atoms of hydrogen, chlorine or bromine, or methyl, methoxy, amino, acetamido, benzamido or ethoxy-carbonylamino groups; $R^5$ represents an atom of hydrogen, or a benzyl, trichloromethylthio, or methanesulphonyl group or a group $R^7CO-$ where $R^7$ represents an atom of hydrogen, a methyl, phenyl, chlorophenyl, propenyl, benzyl, chloromethyl, methylamino, n-butylamino, anilino, or N(N,N'-dimethylureido) group or a 3-alkoxycarbonylamino-1H-2,1,4-benzothiadiazin-1-yl radical; $R^6$ represents an atom of hydrogen, or a methyl, propenyl, phenyl or benzyl group; and R represents a methyl, phenyl, phenylthio, anilino, methylamino, ethylamino, methoxy, ethoxy or isobutoxy group; and n has the value zero or 1.

In a further aspect the invention provides a compound having the formula:

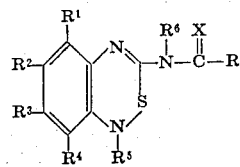

wherein $R^1$, $R^2$, $R^3$ and $R^4$ represent atoms of hydrogen or halogen, or unsubstituted or substituted hydrocarbon groups, or cyano, hydroxy, alkoxy, nitro, carboxylic acid, carboxamide, carboxylic ester, sulphonic acid, sulphonamide, or sulphonate groups, or unsubstituted or substituted amino groups; $R^5$ and $R^6$ represent hydrogen atoms or hydrocarbon groups; R represents an unsubstituted or substituted hydrocarbon group, or an alkoxy, alkylthio, aryloxy, or arylthio group, or an unsubstituted or substituted amino group, or a hydrazino group, or a nitrogen- containing heterocyclic group linked to the carbon atom of the C=X group through the nitrogen atom; X represents an atom of oxygen or sulphur, or an imino group; and acylated derivatives thereof.

In another aspect the invention provides a compound having the formula:

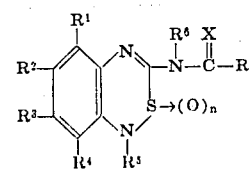

wherein $R^1$, $R^2$, $R^3$ and $R^4$ represent atoms of hydrogen or halogen, or unsubstituted or substituted hydrocarbon groups, or cyano, hydroxy, alkoxy, nitro, carboxylic acid, carboxamide, carboxylic ester, sulphonic acid, sulphonamide or sulphonate groups, or unsubstituted or substituted amino groups; $R^5$ and $R^6$ represent hydrogen atoms or hydrocarbon groups; R represents an unsubstituted or substituted hydrocarbon group, or an alkoxy, alkylthio, aryloxy or arylthio group, or an unsubstituted or substituted amino group, or a hydrazino group, or a nitrogen- containing heterocyclic group linked to the carbon atom of the C=X group through the nitrogen atom; X represents an atom of oxygen or sulphur or an imino group; n has the value 1; or an acylated derivative thereof.

Specific examples of compounds which may be usefully employed as useful pesticidal agents or as active ingredients in pesticidal compositions are set out in Table I below, wherein the values of R, $R^1$, $R^2$, $R^3$, $R^4$, $R^5$, $R^6$ and Z are shown, together with a melting point for each compound expressed in degrees centigrade.

The compounds listed below in Table I all correspond to the general formula:

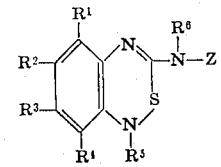

TABLE I

| Compound Number | $R^1$ | $R^2$ | $R^3$ | $R^4$ | $R^5$ | $R^6$ | Z | Melting point in degrees centigrade[1] |
|---|---|---|---|---|---|---|---|---|
| 1 | H | H | H | H | H | H | $-\overset{O}{\underset{\|}{C}}-OC_2H_5$ | 127 |
| 2 | H | H | H | H | H | H | $-\overset{O}{\underset{\|}{C}}-OCH_3$ | 178–180 |
| 3 | H | H | H | H | H | H | $-\overset{O}{\underset{\|}{C}}-OCH_2CH(CH_3)_2$ | 126 |
| 4 | Br | H | $CH_3$ | H | H | H | $-\overset{O}{\underset{\|}{C}}-OC_2H_5$ | 161 |
| 5 | H | H | Cl | H | H | H | Same as above | 165 |

3,760,076

TABLE I—Continued

| Compound Number | R¹ | R² | R³ | R⁴ | R⁵ | R⁶ | Z | Melting point in degrees centigrade[1] |
|---|---|---|---|---|---|---|---|---|
| 6 | H | H | OCH₃ | H | H | H | ...do... | 147 |
| 7 | H | H | CH₃ | H | H | H | ...do... | 161 |
| 8 | H | H | CH₃CONH— | H | H | H | —C(O)—OCH₃ | 270–275 (d) |
| 9 | H | H | CH₃CONH— | H | H | H | —C(O)—OC₂H₅ | 260 (d) |
| 10 | H | H | C₂H₅OCONH— | H | H | H | Same as above | 172 (d) |
| 11 | H | H | C₆H₅CONH— | H | H | H | ...do... —C(O)—OC₂H₅ | 190 (d) |
| 12 | H | H | H | H | H | CH₃ | —C(O)—OCH₃ | 144 |
| 13 | H | H | H | H | H | CH₃ | —C(O)—OC₂H₅ | 82 |
| 14 | H | H | H | H | H | CH₂=CH—CH₂— | Same as above | 60 |
| 15 | H | H | H | H | H | C₆H₅—CH₂— | ...do... | 164 |
| 16 | H | H | H | H | H | C₆H₅— | ...do... | 134 |
| 17 | H | H | H | H | CH₃NHCO— | CH₃ | ...do... | (2) |
| 18 | H | H | H | H | C₆H₅—CH₂— | H | ...do... | 113 |
| 19 | H | H | H | H | H | H | —C(O)—CH₃ | 158 (d) |
| 20 | H | H | H | H | H | H | —C(O)—C₆H₅ | [3] 100-5 |
| 21 | H | H | H | H | H | H | —C(O)—NH—CH₃ | 160 |
| 22 | H | H | H | H | H | H | —C(O)—NH—C₂H₅ | 119 |
| 23 | H | H | H | R⁴ | R⁵ | R⁶ | —C(O)—NH—C₆H₅ | 140 |
| 24 | H | H | H | H | H | H | —C(O)—S—C₆H₅ | 69 |
| 25 | H | H | H | H | CH₃NHCO— | H | —C(O)—C₂H₅ | 210 |
| 26 | H | H | H | H | CH₃NHCO— | H | —C(O)—OCH₃ | 203 |
| 27 | H | H | H | H | C₄H₉NHCO— | H | —C(O)—C₂H₅ | 110 |
| 28 | H | H | H | H | CH₃NHCON(CH₃)CO— | H | Same as above | 208 |
| 29 | H | H | H | H | C₆H₅—NHCO— | H | —C(O)—OC₂H₅ | 188 |
| 30 | H | H | H | H | CH₃CO— | H | —C(O)—C₂H₅ | 128 |
| 31 | H | H | H | H | C₆H₅CH₂CO— | H | —C(O)—OC₂H₅ | 140 |

TABLE I—Continued

| Compound Number | R¹ | R² | R³ | R⁴ | R⁵ | R⁶ | Z | Melting point in degrees centigrade[1] |
|---|---|---|---|---|---|---|---|---|
| 32 | H | H | H | H | ClCH₂CO— | H | Same as above | 170 |
| 33 | H | H | H | H | C₆H₅CO— | H | ....do.... | 141 |
| 34 | H | H | H | H | ClC₆H₄CO— | H | ....do.... | 193 |
| 35 | H | H | H | H | CH₃CH=CH—CO | H | ....do.... | 168 |
| 36 | H | H | H | H | CH₃CO— | H | —C(=O)—OCH₃ | 170 |
| 37 | H | H | H | H | C₆H₅CH₂CO— | H | Same as above | 193 |
| 38 | H | NH₂ | H | H | H | H | —C(=O)—OC₂H₅ | 138 |
| 39 | H | C₂H₅—O—C(=O)—NH | H | H | H | H | Same as above | 165 |
| 40 | H | H | H | H | CHO | H | ....do.... | 195 |
| 41 | H | H | H | H | CHO | H | —C(=O)—OCH₃ | 210 |
| 42 | H | H | H | H | H | H | H | [4] 120 |
| 43 | H | H | H | H | H | H | C₆H₅ | 125 |
| 44 | H | H | H | H | H | H | CH₃ | 138 |
| 45 | H | H | H | H | C₂H₅O₂CNH–C(=S)–CO–N=... (benzothiazolyl) | H | —C(=O)—OC₂H₅ | 260(d) |
| 46 | H | H | H | H | —SO₂Me | H | Same as above | 170 |
| 47 | H | H | H | H | —SCCl₃ | H | ....do.... | 85 (d) |

[1] (d) signifies with decomposition.
[2] Oil (crude).
[3] Crude.
[4] Resolidifies and melts again at 195.

Further specific compounds according to this invention are set out in Table II below, all of which correspond to the formula:

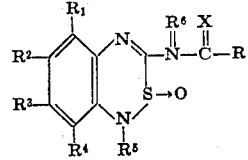

The values of R, R¹, R², R³, R⁴, R⁵, R⁶ and X are given in Table I, together with the melting point of each compound expressed in degrees centigrade.

Particularly preferred compounds which are especially useful as pesticides are those having the structural formula:

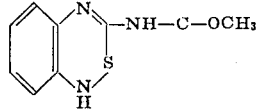

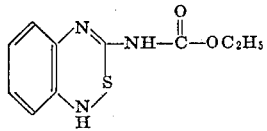

TABLE II

| Compound Number | R | R¹ | R² | R³ | R⁴ | R⁵ | R⁶ | X | Melting point, °C. |
|---|---|---|---|---|---|---|---|---|---|
| 48 | OCH₃ | H | H | H | H | H | H | O | Decomposes at ca. 200. |
| 49 | OC₂H₅ | H | H | H | H | H | H | O | Do. |
| 50 | OC₂H₅ | H | H | H | H | CONHCH₃ | H | O | 169 (d).* |
| 51 | OC₂H₅ | H | H | H | H | COCH₃ | H | O | 172 (d). |

*(d) signifies decomposition.

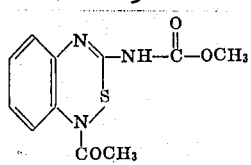

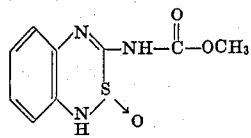

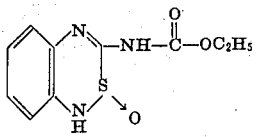

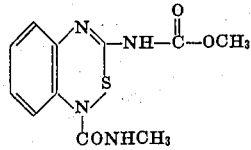

Certain derivatives of the benzothiadiazines of this invention are also useful as pesticides, including for example acid addition salts, and metal derivatives.

Acid addition salts of the benzothiadiazines of this invention include for example, the hydrohalides, for example the hydrochlorides.

A particularly useful acid addition salt of a benzothiadiazine of this invention is the hydrochloride salt of compound No. 2 of Table I hereinabove. It has a melting point of 176°C with decomposition.

In a further aspect therefore, the present invention provides a benzothiadiazine compound as described hereinabove in the form of an acid addition salt thereof.

Metal derivatives of the benzothiadiazines of this invention include, for example, derivatives of benzothiadiazines with alkali metals, alkaline earth metals, and transition metals, for example the sodium, calcium, zinc, copper and iron derivatives.

Particularly useful metal derivatives are the zinc derivative and the copper derivative of compound No. 1 of Table I hereinabove. They both have melting points at temperatures in excess of 300°C.

In another aspect therefore, this present invention provides a benzothiadiazine compound as described hereinabove in the form of a metal derivative thereof.

In this specification and claims the numbering of the atoms comprised by the benzothiadiazine ring system is as follows:

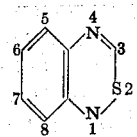

It will be readily apparent to those skilled in the art that the compounds of the invention having the formula:

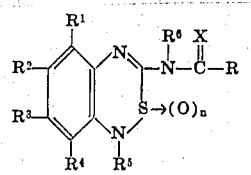

and wherein $R^6$ represents an atom of hydrogen may also be represented as having the tautomeric structure of the formula:

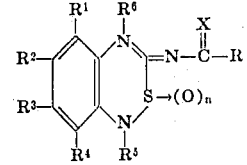

and the invention includes these, and any other, tautomeric structures.

It is to be noted that the sulphoxide group is depicted in the formulae used in this specification as having the form:

by which is intended a dative (or semi-polar) bond linking the sulphur and oxygen atoms. Another, and equally valid, manner of depicting this grouping is:

and the invention is to be understood as comprising within its scope structures so depicted.

The compounds set out in Tables I and II above were prepared by various methods. These methods are recited below and each is accorded a capital letter as an abbreviated reference. This reference is used in the table below listing the compounds by their designating number given in Table I and setting alongside the method(s) of preparation used to make them in each instance.

| Method | Letter of Designation |
|---|---|
| Oxidative cyclisation (p.20–21) | A |
| Reductive cyclisation (p.21–23) | B |
| Halogenated isothiocyanate (p.23–24) | C |

To prepare the sulphoxide derivatives of Table II it is, of course, necessary to perform an additional oxidative step by the procedure set out at page 24 hereinafter.

| Compound Nos. | Method of Preparation |
|---|---|
| 3 to 11 | A |
| 18 to 24 | B |
| 38 | |
| 39 | |
| 1 | |
| 12 to 17 | |
| 25 to 35 | |
| 40 to 51 | A and B |
| 2 | A, B and C |

The compounds of the invention may be obtained in a number of ways. Thus, for example, a compound of the formula:

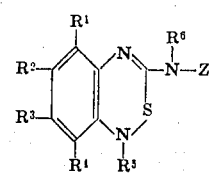

wherein Z represents an atom of hydrogen or an unsubstituted or substituted hydrocarbon group or a group

and wherein $R^1$, $R^2$, $R^3$, $R^4$ represent atoms of hydrogen or halogen, or unsubstituted or substituted hydrocarbon groups, or cyano, hydroxy, alkoxy, nitro, carboxylic acid, carboxamide, carboxylic ester, sulphonic acid, sulphonamide, sulphonate groups, or unsubstituted or substituted amino groups; $R^5$ and $R^6$ represent hydrogen atoms or hydrocarbon groups; R represents an unsubstituted or substituted hydrocarbon group or an alkoxy, alkythio, aryloxy, or arylthio group, or an unsubstituted or substituted amino group, or a hydrazino group, or a nitrogen-containing heterocyclic group linked to the carbon atom of the C=X group through the nitrogen atom; and X represents an atom of oxygen or sulpur or an imino group; by reacting a compound of the formula:

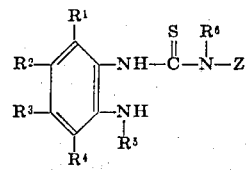

with an oxidising agent, e.g., halogens, N-halo compounds, peroxides, halogen oxy-acid salts, and acidified dichromate salts.

Of these the preferred oxidising agent is N-chlorosuccinimide and the reaction is preferably carried out in an inert solvent. The reaction may be carried out within a temperature range of from −70°C to +30°C, or preferably within a range of from −40°C to 0°C, and optimally within a range of from −10°C to −5°C.

In a further process for the preparation of a compound having the formula:
wherein Z represents an atom of hydrogen or an unsubstituted or substituted hydrocarbon group, or a group

and wherein $R^1$, $R^2$, $R^3$ and $R^4$ represent atoms of hydrogen or halogen, or unsubstituted or substituted hydrocarbon groups, or cyano, hydroxy, alkoxy, nitro, carboxylic acid, carboxamide, carboxylic ester, sulphonic acid, sulphonamide, sulphonate groups, or unsubstituted or substituted amino groups; $R^5$ represents an atom of hydrogen; $R^6$ represents an atom of hydrogen or a hydrocarbon group; R represents an unsubstituted or substituted hydrocarbon group or an alkoxy, alkylthio, aryloxy, or arylthio group, or an unsubstituted or substituted amino group or a hydrazino group, or a nitrogen-containing heterocyclic group linked to the carbon atom of the C=X group through the nitrogen atom; and X represents an atom of oxygen or sulphur or an imino group; by reacting a compound of the formula:

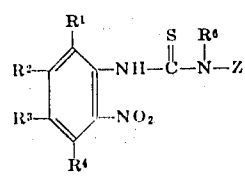

with a reducing agent. In other words the corresponding nitro compound may be reduced to effect cyclisation.

Suitable reducing agents include alkali metal dithionites, for example sodium dithionite; zinc dust may also be used and also ferrous salts, for example ferrous sulphate. The reaction is conveniently carried out in an alkaline medium. When an alkali metal dithionite is used as a reducing agent it is preferable to perform the reduction in the presence of an atmosphere substantially free from oxygen.

A yet further process for the preparation of a compound having the formula:

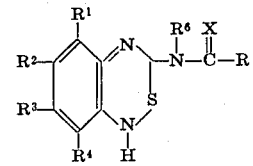

wherein $R^1$, $R^2$, $R^3$ and $R^4$ represent atoms of hydrogen or halogen, or unsubstituted or substituted hydrocarbon groups, or cyano, hydroxy, alkoxy, nitro carboxylic acid, carboxamide, carboxylic ester, sulphonic acid, sulphonamide, sulphonate groups, or unsubstituted or substituted amino groups; $R^6$ represents an atom of hydrogen; R represents an unsubstituted or substituted hydrocarbon group or an alkoxy, alkylthio, aryloxy, or arylthio group, or an unsubstituted or substituted amino group or a hydrazino group, or a nitrogen-containing heterocyclic group linked to the carbon atom of the C=X group through the nitrogen atom; and X represents an atom of oxygen or sulphur or an imino group; comprises reacting a compound of the formula:

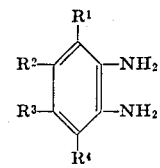

with the product obtained by treating a compound of the formula:

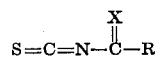

with a halogen, for example chlorine.

The sulphoxides according to the invention may be prepared by oxidising the appropriate benzothiadiazine with an oxidising agent. Suitable oxidising agents include, for example peroxy compounds, such as, for example percarboxylic acids. An especially convenient agent is 3-chloroperbenzoic acid.

Acylated benzothiadiazines according to the invention can be prepared by treating an appropriate benzothiadiazine with an acid halide or acid anhydride. By the term "acid anhydride" as used in this specification and claims is intended any molecule derived from an organic acid by removal of the elements of water, and is to be taken as including inter alia isocyanates.

Metal derivatives according to the invention are conveniently prepared by treating the appropriate benzothiadiazine with an alkali metal hydroxide or carbonate and thereafter reacting the resultant alkali metal derivative with a salt of the metal corresponding to the derivative it is desired to obtain.

An acid addition salt according to the invention may be conveniently prepared by treating the appropriate benzothiadiazine with the appropriate acid.

In a further aspect this invention provides a pesticidal composition comprising as an active ingredient a compound as defined in any of the paragraphs set out above.

The term "pesticidal" in this specification is not intended to include fungicidal, bactericidal and anti-viral action, but only includes insecticidal, arachnidicidal and ovicidal action.

The compounds of the invention, and compositions comprising them are also useful in combating insect and arachnid infestations, and are especially useful in combating the following:

Tetranychus telarius (red spider mites)
Macrosiphon pisi (green aphids)
Myzus persicae (peach aphids)

A particularly useful feature of the activity of active ingredients of the compositions of the present invention is their ability to act individually as systemic pesticides, that is to say, their ability to move in a plant to combat an infection or infestation thereon remote from a site of initial application of a compound. Thus a compound of the invention, or a composition containing the same, may be applied to the soil surrounding the roots of a plant and be taken up by the plant through its roots to combat pests on the plant.

The compounds may be used as such to combat plant pests but are more conveniently applied when admixed with a diluent.

The compositions of the invention can be used to combat plant pests in a number of ways. Thus they can be applied to the foliage of an infected plant, to seed or to the soil in which plants are growing or to be planted.

In a further aspect, therefore, the invention includes a method for combating undesired pests (insect and arachnid) in growing plants which comprises applying to a plant, to the locus of a plant, or to the seeds of a plant a compound or composition as herein defined.

In yet a further aspect the invention includes a method for treating agricultural soil comprising applying to the soil a compound or composition as hereinbefore defined.

In another aspect the invention comprises a method of rendering fruit and vegetable products less susceptible to damage by pests which comprises applying to them a compound or composition as herein described.

The compositions of the invention may be used for agricultural or horticultural purposes and the compound or type of composition used in any instance will depend upon the particular purpose for which it is to be used.

The invention compositions may be in the form of dusting powders or granules wherein the active ingredient is mixed with a solid diluent or carrier. Suitable solid diluents or carriers may be, for example, kaolinate (china clay) montmorillonite, attapulgite, talc, pumice, silica, calcium carbonate, gypsum, powdered magnesia, Fuller's earth, Hewitt's earth and diatomaceous earth. Compositions for dressing seed, for example, may comprise an agent assisting the adhesion of the composition to the seed, for example, a mineral oil.

The compositions may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate sodium, calcium or ammonium lignosulphonate, butylnaphthalene sulphonate, and a mixture of the sodium salts of diisopropyl and triisopropyl napththalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylcresol. Other non-ionic agents are the partial esters derived from long chain fatty acids and hexitol anhydrides, the condensation products of the said partial esters with ethylene oxide, the lecithins, and block copolymers of ethylene oxide and propylene oxide.

Suitable suspending agents are, for example, bentonite, pyrogenic silica, and hydrophilic colloids, for example polyvinylpyrrolidone and sodium carboxymethylcellulose, and the vegetable gums, for example gum acacia and gum tragacanth.

The aqueous solutions dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The active ingredients may also be formulated into compositions comprising capsules or microcapsules containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, for improving the distribution, adhesive powder and resistance to rain on treated surfaces, the different compositions can be better adapted for the various uses for which they are intended. The active ingredients of this invention as hereinbefore defined may also be conveniently formulated by admixing them with fertilizers. A preferred composition of this type comprises granules of fertilizer material incorporating, for example coated with, an active ingredient. The fertilizer material may, for example, comprise nitrogen or phosphate-containing substances.

In yet a further aspect of the invention, therefore, we provide a fertilizer comprising an active ingredient as hereinbefore defined.

The compositions which are to be used in the form of aqueous dispersions or emulsions are generally supplied in the form of a concentrate containing a high proportion of the active ingredient or ingredients, the said concentrate to be diluted with water before use.

These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.0001% and 1.0% by weight of active ingredient or ingredients may be used.

It is to be understood that the pesticidal compositions of this invention may comprise, in addition to an active ingredient as hereinbefore defined, one or more other compounds having biological activity.

The invention is illustrated, but not limited, by the following examples.

EXAMPLE 1

This example illustrates the preparation of ethyl 1H-2,1,4-benzothiadiazin-3-ylcarbamate (compound No. 1 of Table I) having the formula:

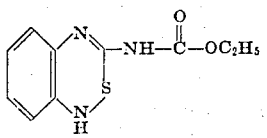

To a stirred solution of 2ethoxycarbonylthioureidoaniline (0.3 g.) in methylene chloride (25 cc.) at room temperature was added dropwise a solution of N-chlorosuccinimide (0.179 g.) in methylene chloride (15 cc.) over 5 minutes. When the addition was complete aqueous saturated sodium bicarbonate solution (50 cc.) was added and after vigorous stirring for one minute, the organic phase was separated, washed with a further aliquot of saturated sodium bicarbonate solution (50 cc.) and dried over anhydrous sodium sulphate. The solvent was removed by evaporation at room temperature under reduced pressure and the residual solid recrystallised from benzene to yield ethyl 1H-2,1,4-benzothiadiazin-3-ylcarbamate as yellow needles, having a melting point of 130°C.

EXAMPLE 2

This example illustrates an alternative method for the preparation of the compound of Example 1.

A solution of 2-ethoxycarbonylthioureidoaniline (0.25 g.) and sodium bicarbonate (0.5 g.) in a mixture of ethanol and water (3:1 by volume; 75 cc.) was treated dropwise with stirring with a solution of iodine (0.27 g.) and potassium iodide (0.5 g.) in water (25 cc.). When the addition was complete, water (100 cc.) was added and the mixture extracted twice with methylene chloride (100 cc.) After drying the organic phase over anhydrous sodium sulphate and evaporating the solvent under reduced pressure, there was obtained ethyl 1H-2,1,4-benzothiadiazin-3-ylcarbamate, identical with the product of Example 1.

EXAMPLE 3

This example illustrates the preparation of ethyl 7-chloro-1H-2,1,4-benzothiadiazin-3-ylcarbamate (compound No. 5 of Table I) having the structure:

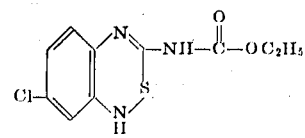

To a solution of 5-chloro-2-ethoxycarbonylthioureidonitrobenzene (2.0 g.) having the formula:

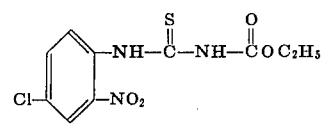

in 2% aqueous sodium hydroxide (50 cc.) was added in small portions, with stirring, solid sodium dithionite (2.0 g.) keeping the mixture temperature in the range 23–28°C. When addition was complete the mixture was stirred for 3 minutes. The pH was then adjusted to 7 with dilute hydrochloric acid, and the precipitate collected by filtration. Recrystallisation of the solid from aqueous methanol yielded 7-chloro-1H-2,1,4-benzothiadiazin-3-ylcarbamate, having a melting point of 165–6°C.

EXAMPLE 4

By a procedure similar to that illustrated in Example 3 the compounds numbered 4, 6 and 7 in Table I were obtained when the appropriately substituted 2-ethoxycarbonylthioureidonitrobenzene was used as starting material.

EXAMPLE 5

This example illustrates the preparation of ethyl N-1H-2,1,4-benzothiadiazin-3-yl-N-methylcarbamate (compound No. 13 of Table I) having the formula:

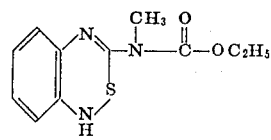

A stirred solution of o-phenylene diamine (10.8 g.) in acetone (200 cc.) was cooled to 0°C and a solution of methyl isothiocyanate (7.3 g.) in acetone (50 cc.) added dropwise, and stirring was continued for 2 hours. After evaporation of the solvent the residue was dissolved in dilute hydrochloric acid, washed with methylene chloride, and the aqueous phase neutralised with sodium bicarbonate. The oily precipitate was extracted with methylene chloride, and the extracts dried over sodium sulphate. After removal of the solvent by evaporation the residual solid was recrystallised from benzene to yield N-2-anilino-N'-methylthiourea, having the formula:

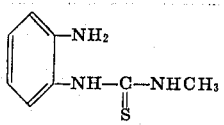

and having a melting point of 138°C.

N-2-anilino-N'-methylthiourea (2.0 g.) was dissolved in methylene chloride (60 cc.) and treated at 18°C dropwise with a solution of N-chlorosuccinimide (1.45 g.) in methylene chloride (30 cc.). The precipitate was collected by filtration and washed with methylene chloride to yield a compound having a melting point of 150°C (decomposition) and believed to be the hydrochloride of the benzothiadiazine having the structure:

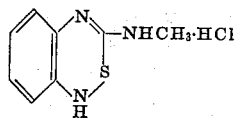

To a solution of this compound (0.215 g.) in methylene chloride (10 cc.) was added trimethylamine (0.1 g.) and ethyl chloroformate 0.108 g.) at 18°C. After five minutes the precipitate was filtered off and the filtrate washed with saturated aqueous sodium bicarbonate solution and then dried over anhydrous sodium sulphate. After removal of the solvent by evaporation at reduced pressure and the ambient temperature, the residual solid was recrystallised from ethanol to yield ethyl N-1H-2,1,4-benzothiadiazin-3-yl-N-methylcarbamate having a melting point of 80–81°C.

EXAMPLE 6

This example illustrates the preparation of ethyl N-1H-2,1,4-benzothiadiazin-3-yl-N-methylcarbamate (compound No. 13 of Table I) having the structure:

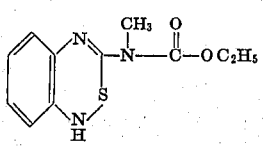

by a procedure different from that illustrated in Example 5 above.

To a solution of the product of Example 1 (4.0 g.) in acetone (120 cc.) was added anhydrous potassium carbonate and the mixture was stirred for 1 hour. Methyl iodide (4.3 g.) was then added, and the mixture stirred for a further period of 18 hours. The solid was removed by filtration and the filtrate evaporated to dryness. The residue was partitioned between benzene and water, and the organic phase separated and dried over anhydrous sodium sulphate. After evaporation of the solvent the residual solid was purified by fractional crystallisation to give ethyl N-1H-2,1,4-benzothiadiazin-3-yl-N-methylcarbamate, having a melting point of 79–81°C, and identical with the product obtained by the procedure illustrated in Example 5.

EXAMPLE 7

This example illustrates the preparation of methyl 1-H-2,1,4-benzothiadiazin-3-ylcarbamate (compound No. 2, Table I), having the formula:

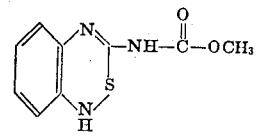

Methoxycarbonylisothiocyanate (0.35 g.) was treated by adding dropwise a solution of chlorine (0.212 g.) in carbon tetrachloride (5 cc.) at −10°C, and after the addition was complete, stirring the mixture for a period of 30 minutes. The mixture was then added dropwise to a solution of o-phenylene diamine (0.32 g.) in carbon tetrachloride (5 cc.) whereupon a brown precipitate was formed. Triethylamine (0.30 g.) was then added and the mixture stirred for a further period of 30 minutes, after which the mixture was poured into water and the carbon tetrachloride layer separated. Examination of the carbon tetrachloride solution by thin-layer chromatrography on silica gel using an 85:15 (v/v) chloroform:ether mixture as eluent, development of the spots using a dilute ferric chloride spray and comparison of the $R_f$ value with that obtained from an authentic sample, indicated that methyl 1H-2,1,4-benzothiadiazin-3-ylcarbamate was obtained by the above process.

EXAMPLE 8

This example illustrates the preparation of the copper derivative of ethyl 1H-2,1,4-benzothiadiazin-3-ylcarbamate.

Ethyl 1H-2,1,4-benzothiadiazin-3-ylcarbamate (1.5 g.) was dissolved in a solution of sodium hydroxide (0.255 g.) in water (25 cc.), the solution filtered and a solution of cupric sulphate pentahydrate (0.79 g.) in water (8 cc.) added to the filtrate. After a period of 15 minutes during which the mixture was stirred, the precipitate was collected by filtration and dried to yield the copper derivative of ethyl 1H-2,1,4-benzothiadiazin-3-ylcarbamate which did not melt when heated to a temperature of 300°C.

EXAMPLE 9

By a procedure similar to that illustrated in Example 8 above, but using zinc chloride (0.445 g.) in place of cupric sulphate pentahydrate, the corresponding zinc derivative of ethyl 1H-2,1,4-benzothiadiazin-3-ylcarbamate was prepared. It did not melt when heated to a temperature of 300°C.

EXAMPLE 10

This example illustrates the preparation of acid addition salt obtained from hydrochloric acid and methyl 1H-2,1,4-benzothiadiazin-3-ylcarbamate.

Hydrogen chloride gas was bubbled into a solution of methyl 1H-2,1,4-benzothiadiazin-3-ylcarbamate (1.0 g.) in methylene chloride (20 cc.), until precipitation was complete. The solid, which was collected by filtration, was methyl 1H-2,1,4-benzothiadiazin-3-ylcarbamate hydrochloride, having a melting point of 176°C. with decomposition.

EXAMPLE 11

This example illustrates the preparation of methyl 1-H-2,1,4-benzothiadiazin-3-ylcarbamate (compound No. 2, Table I), having the structure:

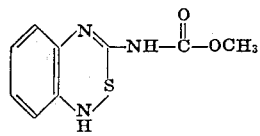

2-Methoxycarbonylthiureidoaniline (112.5 g.) was stirred with dichloromethane (750 cc.) and the suspension cooled to about −10°C. To this suspension was added, during 45 minutes, a solution of N-chlorosuccinimide (67 g.) in dichloromethane (1·0 l.) whilst the temperature was maintained between −10°C and −5°C. On completion of the addition the mixture was filtered and the pale yellow crystalline solid washed with chilled dichloromethane and then dried. This solid was added to a stirred solution of potassium bicarbonate (50 g.) in water (1·0 l.), and after 20 minutes the white solid product was collected by filtration, washed with water and dried to yield methyl 1H-2,1,4-benzothiadiazin-3-ylcarbamate, having a melting point of 168°C.

EXAMPLE 12

This example illustrates the preparation of methyl 1-H-2,1,4-benzothiadiazin-3-ylcarbamate (compound No. 2, Table I), by a different procedure to that illustrated in Example 11 above.

Sodium hydroxide (180 g.) was dissolved in water (2·5 l.) and 2-methoxycarbonylthiureidonitrobenzene (255 g.) added with stirring until the whole had dissolved. The solution was then cooled to 10°C and the vessel containing the solution purged with nitrogen. A A solution containing two moles of sodium dithionite in water (1·5 l.) was added to the solution during 30 minutes, whilst the temperature was maintained in the range 10 to 20°C by external cooling. On completion of the addition the yellow suspension was filtered, and the solid product thus collected washed thoroughly with cold water, after which it was air dried, yielding methyl 1H-2,1,4-benzothiadiazin-3-ylcarbamate, having a melting point of 168°C and identical with the product obtained by the procedure in Example 11.

EXAMPLE 13

This example illustrates the preparation of 3-amino-1H-2,1,4-benzothiadiazine (compound No. 42, Table I), having the formula:

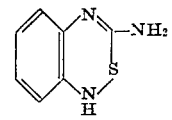

A vigorously stirred suspension of 2-aminophenylthiourea (5 g.) in a two-phase system of diethyl ether (250 cc.) and an aqueous solution of sodium bicarbonate (200 cc; 5% w/v), was treated with a solution of N-chlorosuccinimide (4 g.) in dichloromethane (80 cc.) over a period of 30 minutes. The mixture was filtered, the ether layer separated, washed with aqueous sodium bicarbonate solution, and with water, and dried over anhydrous sodium sulphate. Evaporation of the ether yielded the product, 3-amino-1H-2,1,4-benzothiadiazine, having a melting point of 120°C.

EXAMPLE 14

This example illustrates the preparation of N-1H-2,1,4-benzo-thiadiazin-3-yl N'-methylurea (compound No.21, Table I), having the formula:

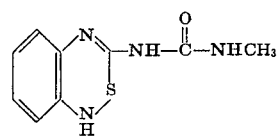

A stirred suspension of 3-amino-1H-2,1,4-benzothiadiazine (1.65 g.) in methylene chloride (50 cc.) was treated with methyl isocyanate (0.6 g.) and stirred for 15 minutes. The solvent was then removed by evaporation, and the residue taken up in acetone, filtered, the filtrate evaporated, and the residual solid recrystallised from benzene to yield N-1H-2,1,4-benzothiadiazin-3-yl N'-methylurea, having a melting point of 160°C.

EXAMPLE 15

This example illustrates the preparation of N-1H-2,1,4-benzothiadiazin-3-yl N'-phenylurea (compound No. 23, Table I), having the formula:

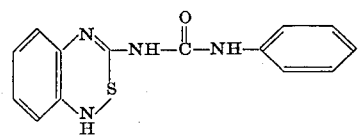

A stirred suspension of 3-amino-1H-2,1,4-benzothiadiazine (1.65 g.) in dichloromethane (50 cc.) was treated with phenyl isocyanate (1.19 g.). After a period of 30 minutes the precipitated solid was filtered off and recrystallised from benzene to yield N-1H-2,1,4-benzothiadiazin-3-yl N'-phenylurea, having a melting point of 140°C.

EXAMPLE 16

This example illustrates the preparation of methyl 1-H-2,1,4-benzothiadiazin-3-ylcarbamate (compound No. 2, Table I) by a procedure different from that illustrated in Example 11 or Example 12. A stirred solution of 2-aminophenylthiourea (1.67 g.) in acetone (75 cc.) was treated with a solution of N-chlorosuccinimide (1.34 g.) in acetone (25 cc.). The solution was decanted in an aqueous sodium bicarbonate solution (50 cc; 5% w/v). Methyl chloroformate (1.42 g.) in acetone (10 cc.) was then added to the mixture over a period of 10 minutes, with stirring, after which stirring was continued for another 90 minutes. The precipitate was then collected by filtration and recrystallised from a mixture of benzene and ethanol to yield methyl 1H-2,1,4-benzothiadiazin-3-ylcarbamate, having a melting point of 180°C.

EXAMPLE 17

This example illustrates the preparation of 3-acetamido-1H-2,1,4-benzothiadiazine (compound No. 19, Table I), having the formula:

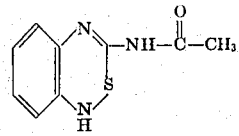

A mixture of 3-amino-1H-2,1,4-benzothiadiazine (1.65 g.) and potassium carbonate (3 g.) in dichloromethane (50 cc.) was treated with acetic anhydride (1.02 g.) and the mixture stirred at room temperature for 16 hours. The solid was filtered off, washed well with water, dried and recrystallised from ethyl acetate to yield 3-acetamido-1H-2,1,4-benzothiadiazine, having a melting point of 158°C with decomposition.

EXAMPLE 18

This example illustrates the preparation of ethyl 1-benzyl-1H-2,1,4-benzothiadiazin-3-ylcarbamate (compound No. 18, Table I) having the structure:

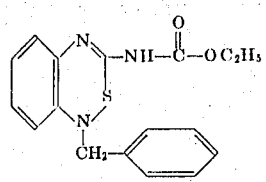

A solution of 2-ethoxycarbonylthiureidoaniline (2.0 g.) in glacial acetic acid (35 cc.) was treated dropwise with benzaldehyde (2 cc.) and after 5 minutes the precipitate was collected by filtration, washed with water, and added to an ethanol (90 cc.) and water (10 cc.) mixture. The mixture was then treated with excess solid sodium borohydride with vigorous stirring. After 30 minutes the mixture was poured into aqueous 2N hydrochloric acid (300 cc.), neutralised with sodium bicarbonate, and the mixture extracted with ethyl acetate. The ethyl acetate extract was dried over anhydrous sodium sulphate and then evaporated to yield 1-benzylamino-2-ethoxycarbonylthiureidobenzene having a melting point of 151°C.

A mixture of 1-benzylamino-2-ethoxycarbonylthiureidobenzene (2.2 g.) and sodium bicarbonate (1.5 g.) in dichloromethane (25 cc.) was treated with a solution of N-chlorosuccinimide (0.9 g.) in dichloromethane (30 cc.). The mixture was then washed with aqueous sodium bicarbonate solution, the dichloromethane solution evaporated to yield a residue, which on recrystallisation from a mixture of ethyl acetate and petroleum ether (boiling range 40–60°C) yielded ethyl 1-benzyl-1H-2,1,4-benzothiadiazin-3-ylcarbamate, having a melting point of 112–115°C.

EXAMPLE 19

This example illustrates the preparation of methyl 1-methyl-carbamoyl-1H-2,1,4-benzothiadiazin-3-ylcarbamate (compound No. 26, Table I) having the formula:

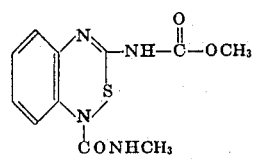

A solution of methyl 1H-2,1,4-benzothiadiazin-3-ylcarbamate (2.23 g.) in pyridine (25 cc.) was treated with methyl isocyanate (1.41 g.) and stirred for 16 hours. The pyridine was removed under reduced pressure and the residual oil triturated with benzene to yield a white solid, which on recrystallisation from ethanol yielded methyl 1-methylcarbamoyl-1H-2,1,4-benzothiadiazin-3-ylcarbamate, having a melting point of 203°C.

EXAMPLE 20

This example illustrates the preparation of ethyl 1-phenylcarbamoyl-1H-2,1,4-benzothiadiazinyl-3-ylcarbamate, (compound No. 29, Table I) having the formula:

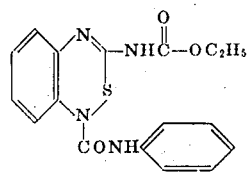

A stirred solution of 2-ethoxycarbonylthiureidoaniline (14.34 g.) in acetone (500 cc.) was treated with a solution of phenyl isocyanate (7.14 g.) in acetone (100 cc.) and after 2 hours the product, N-2-ethoxycarbonylthiureidophenyl-N'-phenylurea, was collected by filtration. It had a melting point of 220°C with decomposition. A suspension of N-2-ethoxycarbonylthiureidophenyl-N'-phenylurea (1.79 g.) in dichloromethane (25 cc.) was treated with a solution of N-chlorosuccinimide (0.67 g.) in dichloromethane and the resultant solution was washed with aqueous sodium bicarbonate solution. The organic phase was dried over anhydrous sodium sulphate and the solvent evaporated to give a crystalline solid which after two recrystallisations from ethyl acetate yielded to ethyl 1-phenylcarbamoyl-1H-2,1,4-benzothiadiazin-3-ylcarbamate having a melting point of 188°C.

EXAMPLE 21

This example illustrates the preparation of ethyl 1-acetyl-1H-2,1,4-benzothiadiazin-3-ylcarbamate (compound No. 30, Table I), having the formula:

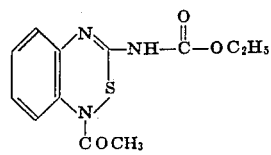

A mixture of ethyl 1H-2,1,4-benzothiadiazin-3-ylcarbamate (4.75 g.) and sodium bicarbonate (4.5 g.) in acetone (150 cc.) was treated with acetyl chloride (1.57 g.). After 15 minutes stirring the mixture was filtered and the filtrate evaporated. The residual solid was recrystallised from ethanol to yield ethyl 1-acetyl-1H-2,1,4-benzothiadiazin-3-ylcarbamate, having a melting point of 128°C.

EXAMPLE 22

This example illustrates the preparation of diethyl 1-H-2,1,4-benzothiadiazin-3,7-yldicarbamate (compound No. 10, Table I) having the formula:

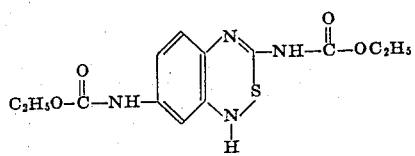

A mixture of N(4-ethoxycarbonylthiureido-3-nitrophenylcarbamate (1.07 g.), 1N sodium hydroxide solution (13.5 cc.) and water (16.5 cc.) was stirred, and treated with an aqueous solution of sodium dithionite monohydrate (1.36g; 85% pure) in water (12 cc.). The precipitated solid was collected by filtration, washed with water, and recrystallised from ethanol to yield diethyl 1H-2,1,4-benzothiadiazin-3,7-yldicarbamate, having a melting point of 172–3°C.

EXAMPLE 23

This example illustrates the preparation of ethyl 1H-2,1,4-benzothiadiazin-3-ylcarbamate S-oxide, having the formula:

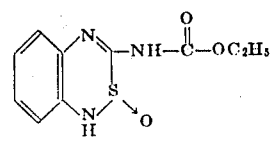

To a stirred solution of ethyl 1H-2,1,4-benzothiadiazin-3-ylcarbamate (0.5 g.) in methylene chloride (9.0 g.) is added a solution of 3-chloroperbenzoic acid (0.33 g.) in methylene chloride (4.0 cc.) at 18°C. The precipitated crystals were filtered off, washed with aqueous sodium bicarbonate and dried at room temperature to yield ethyl 1H-2,1,4-benzothiadiazin-3-ylcarbamate S-oxide, having a melting point (with decomposition) at 200°C.

EXAMPLE 24

By a similar procedure to that illustrated in Example 23 above methyl 1H-2,1,4-benzothiadiazin-3-ylcarbamate was converted to the corresponding S-oxide; the product melted with decomposition at 200°C.

EXAMPLE 25

This example illustrates an atomisable fluid comprising a mixture consisting of 25% by weight of compound No. 1 of Table I and 75% by weight of xylene.

EXAMPLE 26

This example illustrates a dusting powder which may be applied directly to plants or other surfaces and comprises 1% by weight of compound No. 2 of Table I and 99% by weight of talc.

EXAMPLE 27

25 Parts by weight of the compound No. 3 of Table I, 65 parts by weight of xylene, and 10 parts of an alkyl aryl polyether alcohol ('Triton' X-100; 'Triton' is a Trade Mark) were mixed in a suitable mixer. There was thus obtained an emulsion concentrate which can be mixed with water to produce an emulsion suitable for use in agricultural applications.

EXAMPLE 28

5 Parts by weight of compound No. 4 of Table I were thoroughly mixed in a suitable mixer with 95 parts by weight of talc. There was thus obtained a dusting powder.

EXAMPLE 29

10 Parts by weight of compound No. 1 of Table I, 10 parts of an ethylene oxide-octylphenol condensate ("Lissapol" NX: Lissapol is a Trade Mark) and 80 parts by weight of diacetone alcohol were thoroughly mixed. There was thus obtained a concentrate which, on mixing with water, gave an aqueous dispersion suitable for application as a spray in the control of pests.

EXAMPLE 30

This example illustrates a concentrated liquid formulation in the form of an emulsion. The ingredients listed below were mixed together in the stated proportions and the whole stirred until the constituents were dispersed.

|  | % wt. |
|---|---|
| Compound No. 5 (Table I) | 20% |
| LUBROL L (Lubrol is a Trade Mark) | 17% |
| Calcium dodecylbenzenesulphonate | 3% |
| Ethylene dichloride | 45% |
| AROMASOL H (Aromasol is a Trade Mark) | 15% |
|  | 100% |

EXAMPLE 31

The ingredients listed below were ground together in the proportions stated to produce a powdered mixture readily dispersible in liquids.

|  | % wt. |
|---|---|
| Compound No. 6 (Table I) | 50% |
| Dispersol T (Dispersol is a Trade Mark) | 5% |
| China clay | 45% |
|  | 100% |

EXAMPLE 32

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44-100 to obtain the desired size of grains.

|  | % wt. |
|---|---|
| Compound No. 2 (Table I) | 50% |
| Dispersol T | 12.5% |
| Calcium lignosulphonate | 5% |
| Sodium dodecylbenzenesulphonate | 12.5% |
| Sodium acetate | 20% |
|  | 100% |

EXAMPLE 33

A composition suitable or use as a seed dressing was prepared by mixing all three of the ingredients set out below in the proportions stated.

|  | % wt. |
|---|---|
| Compound No. 7 (Table I) | 80% |
| Mineral Oil | 2% |
| China clay | 18% |
|  | 100% |

EXAMPLE 34

A granular composition was prepared by dissolving the active ingredient in a solvent, spraying the solution obtained onto the granules of pumice and allowing the solvent to evaporate.

|  | % wt. |
|---|---|
| Compound No. 2 (Table I) | 5% |
| Pumice Granules | 95% |
|  | 100% |

EXAMPLE 35

An aqueous dispersion formulation was prepared by mixing and grinding the ingredients recited below in the proportions stated.

|  | % wt. |
|---|---|
| Compound No. 4 (Table I) | 40% |
| Calcium lignosulphonate | 10% |
| Water | 50% |
|  | 100% |

EXAMPLE 36

A composition in the form of grains readily dispersible in a liquid such as water was prepared by grinding together the first four of the ingredients listed below in the presence of water and then the sodium acetate was mixed in. The admixture was dried and passed through a British Standard mesh sieve to obtain the desired size of grains.

|  | % wt. |
|---|---|
| Compound No. 2 of Table I | 50% |
| Dyapol PT | 4.4% |
| Dispersol T | 23.0% |
| Lissapol NX | 0.2% |
| Anhydrous sodium acetate | 22.4% |
|  | 100% |

The following constitutes an explanation of the compositions or substances represented by the various Trade Marks and Trade names referred to in the foregoing Examples.

LUBROL L — is a condensate of 1 mole of nonyl phenol with 13 molar proportions of ethylene oxide.

AROMASOL H is a solvent mixture of alkylbenzenes.

DISPERSOL T is a mixture of sodium sulphate and a condensate of formaldehyde with the sodium salt of naphthalene sulphonic acid.

LISSAPOL NX is a condensate of 1 mole of nonyl phenol with 8 moles of ethylene oxide.

DYAPOL PT is a sulphonated formaldehyde phenolic condensate.

EXAMPLE 37

Compounds of the invention were tested against the adults and eggs of red spider mites (Tetranychus telarius). Test solutions were prepared by dissolving a weighed sample of the compound to be tested in a mixture of acetone and ethanol, and then diluted with water containing as a surface-active agent Lissapol NX. The composition of the test solutions was as follows:

| Test compound |  | 0.05% |
|---|---|---|
| Acetone |  | 2.00% |
| Ethanol |  | 2.00% |
| Lissapol NX |  | 0.01% |
| Water | up to | 100.00% |

The effectiveness of the invention compounds was demonstrated in several ways.

In the contact test plants infested with both adult mites and eggs were sprayed with the test solution. After 1 week the effects on the mites and eggs were assessed. The population of adults and eggs on untreated plants was also assessed after 1 week to act as a control. The results are recorded in Table XI.

TABLE XI

| Compound No. (Table I) | If reduction in no. of adults | % eggs unhatched | % eggs hatched and larvae dead | % eggs hatched and larvae alive |
|---|---|---|---|---|
| 2 | Yes | 91 | 4 | 5 |
| 1 | Yes | 83 | 13 | 4 |
| Control | No | 50 | 0 | 50 |

In a similar test the adults were removed before spraying the plants and the effects on the eggs alone assessed after 1 week. The results are given in Table XII below.

TABLE XII

| Compound No. (Table I) | % eggs hatched and larvae alive |
|---|---|
| 2 | 1.8% |
| 1 | 28.0% |
| Control | 45.0% |

In another test the systemic nature of the compounds of the invention was demonstrated. The soil in which the bean plants were growing was watered with the test solution and the plants infested with adult mites 24 hours later. After 1 week the effect on the eggs laid by the adults was assessed. The results are given in Table XIII below.

TABLE XIII

| Compound No. (Table I) | % unhatched eggs | % hatched eggs |
|---|---|---|
| 2 | 100% | 0% |
| 1 | 99.7% | 0.3% |
| Control | 68% | 32% |

In another test the residual effect of the compounds was assessed by spraying bean plants with the test solutions. Four groups of plants were left for varying periods before infesting with adult mites, and the effects on the eggs laid by the adult mites was assessed 1 week after infestation. The results are given in Table XIV below.

TABLE XIV

| Time elapsed between spraying and infesting | Compound No. (Table I) | % unhatched eggs | % hatched eggs |
|---|---|---|---|
| 1 hour | 2 | 97 | 3 |
|  | 1 | 87 | 13 |
|  | Control | 47 | 53 |
| 1 day | 2 | 99.8 | 0.2 |
|  | 1 | 93 | 7 |
|  | Control | 56 | 44 |
| 2 days | 2 | 96 | 4 |
|  | 1 | 86 | 14 |
|  | Control | 40 | 60 |
| 4 days | 2 | 95 | 5 |
|  | 1 | 70 | 30 |
|  | Control | 44 | 56 |

EXAMPLE 38

This example illustrates the contact acaricidal effect of a compound of the present invention.

A population of red-spider mites (Tetranychus telarius) supported on French bean plants was sprayed with a composition containing 500 ppm. of compound No. 36 of Table I.

After 12 days the population of adult spiders was observed to have declined to the extent of 95% of its original size.

EXAMPLE 39

The effectiveness of an invention compound in controlling populations of peach aphids (Myzus persicae) on sugar beet was demonstrated by the following test. A test solution of the compound was prepared as illustrated in Example 47 and sugar beet plants sprayed with the solution. One hour later each plant was infested with 30 adult aphids and the number of aphids on the plant assessed after 3 days and after 6 days. As a control untreated plants were similarly infested and the population assessed after 3 days and after 6 days. The results are given in Table XV below.

TABLE XV

| Compound No. | No. of aphids/plant | | |
|---|---|---|---|
|  | at commencement of test | after 3 days | after 6 days |
| 1 | 30 | 17 | 6 |
| Control | 30 | 49 | 54 |

EXAMPLE 40

This example illustrates the control of a population of green aphids (Macrosiphon pisi) by contacting the aphids and their habitat with a spray composition comprising an invention compound.

Broad bean plant infested with adult Macrosiphon pisi were sprayed with a composition comprising 500 ppm. of compound No. 36 of Table I.

After 5 days 100% mortality of the aphids was observed.

We claim:

1. A method of combating insect and arachnid pests which comprises applying to the pests or pest habitat, an insecticidally or acoricidally effective amount of a compound of the formula:

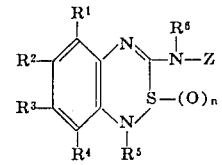

wherein Z represents hydrogen, methyl, phenyl, cyano or

wherein X is oxygen, sulphur or imino and R is methyl, phenyl, phenylthio, anilino, methylamino, ethylamino, methoxy, ethoxy or isobutoxy; wherein $R^1$, $R^2$, $R^3$ and $R^4$ represent hydrogen, halogen, alkyl of from 1 to 6 carbon atoms, alkoxy of from 1 to 6 carbon atoms, amino, acetamido, ethoxycarbonylamino or benzamido; $R^5$ is hydrogen, benzyl, trichloromethylthio, methanesulphonyl or the group $R^7CO-$ where $R^7$ is hydrogen, methyl, phenyl, chlorophenyl, propenyl, benzyl, chloromethyl, methylamino, n-butylamino, anilino, N(N,N'-dimethylureido) or 3-ethoxycarbonylamino-1H-2,1,4-benzothiadiazin-1-yl; $R^6$ is hydrogen, alkyl of from 1 to 6 carbon atoms, propenyl, phenyl or benzyl; and n has the value zero or 1, an acid addition salt or the alkali metal, alkaline earth metal, zinc or copper salt of such a compound.

2. The method of claim 1 wherein said compound has the formula:

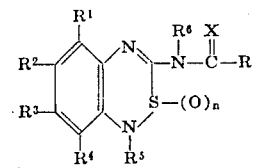

$R^1$, $R^2$, $R^3$ and $R^4$ represent hydrogen, chlorine, bromine, methyl, methoxy, amino, acetamido, benzamido or ethoxycarbonylamino; $R^5$ represents hydrogen, benzyl, trichloromethylthio, methanesulphonyl or $R^7CO-$ where $R^7$ represents hydrogen, methyl, phenyl, chlorophenyl, propenyl, benzyl, chloromethyl, methylamino, n-butylamino, anilino, N(N,N'-dimethyl-ureido) or 3-ethoxycarbonylamino-1H-2,1,4-benzo-thiadiazin-1-yl; $R^6$ represents hydrogen, methyl, propenyl, phenyl or benzyl; and R represents methyl, phenyl, phenylthio, anilino, methylamino, ethylamino, methoxy, ethoxy or isobutoxy; and n has the value zero or 1.

3. The method of claim 1 wherein the compound is

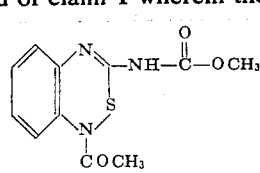

4. The method of claim 1 wherein said compound is selected from the group consisting of compounds having the formulae:

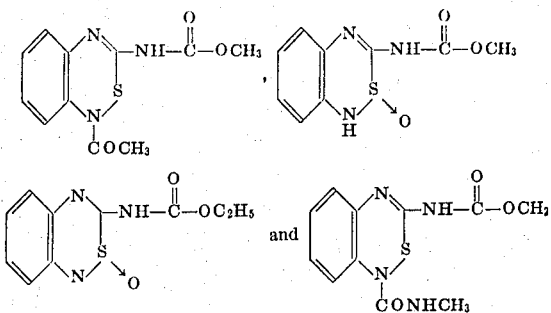

5. An insecticidal and acaricidal composition comprising, as the active ingredient, an insecticidally or acoricidally effective amount of a compound of the formula:

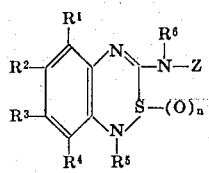

wherein Z represents hydrogen, methyl, phenyl, cyano or

wherein X is oxygen, sulphur or imino and R is methyl, phenyl, phenylthio, anilino, methylamino, ethylamino, methoxy, ethoxy or isobutoxy; wherein $R^1$, $R^2$, $R^3$ and $R^4$ represent hydrogen, halogen, alkyl of from 1 to 6 carbon atoms, alkoxy of from 1 to 6 carbon atoms, amino, acetamido, ethoxycarbonylamino or benzamido; $R^5$ is hydrogen, benzyl, trichloromethylthio, methanesulphonyl or the group $R^7CO$- where $R^7$ is hydrogen, methyl, phenyl, chlorophenyl, propenyl, benzyl, chloromethyl, methylamino, n-butylamino, anilino, N(N,N'-dimethylureido) or 3-ethoxycarbonylamino-1H-2,1,4-benzothiadiazin-1-yl; $R^6$ is hydrogen, alkyl of from one to 6 carbon atoms, propenyl, phenyl or benzyl; and n has the value zero or 1, an acid addition salt or the alkali metal, alkaline earth metal, zinc or copper salt of such a compound, together with a major proportion of a carrier therefor.

* * * * *